United States Patent
Vieillot

(10) Patent No.: US 8,241,030 B2
(45) Date of Patent: Aug. 14, 2012

(54) DRAWING-BLOWING METHOD AND DEVICE FOR MOLDING THERMOPLASTIC MATERIAL CONTAINERS, IN PARTICULAR BOTTLES, WITH PETALOID BOTTOMS

(75) Inventor: Philippe Vieillot, Octeville-sur-Mer (FR)

(73) Assignee: Sidel Participations, Octeville Sur Mer (FR)

( * ) Notice: Subject to any disclaimer, the term of this patent is extended or adjusted under 35 U.S.C. 154(b) by 432 days.

(21) Appl. No.: 12/634,327

(22) Filed: Dec. 9, 2009

(65) Prior Publication Data

US 2010/0086635 A1    Apr. 8, 2010

Related U.S. Application Data

(62) Division of application No. 11/635,019, filed on Dec. 7, 2006, now Pat. No. 8,052,916.

(30) Foreign Application Priority Data

Dec. 8, 2005  (FR) ...................................... 05 12486

(51) Int. Cl.
    *B29C 49/08*    (2006.01)
(52) U.S. Cl. ......... 425/529; 264/519; 264/532; 264/520

(58) Field of Classification Search ........................ None
    See application file for complete search history.

(56) References Cited

U.S. PATENT DOCUMENTS

| | | | |
|---|---|---|---|
| 5,229,142 A | 7/1993 | Yokobayashi | |
| 2007/0108157 A1 * | 5/2007 | Dupuis et al. | ................. 215/379 |

FOREIGN PATENT DOCUMENTS

| | | |
|---|---|---|
| EP | 0 029 639 A1 | 6/1981 |
| JP | 62-144612 U | 9/1987 |
| JP | 4-119819 A | 4/1992 |
| JP | 09-118322 A | 5/1997 |

* cited by examiner

*Primary Examiner* — Monica A Huson
(74) *Attorney, Agent, or Firm* — Sughrue Mion, PLLC

(57) ABSTRACT

The invention relates to manufacturing thermoplastic material containers (2) with a petaloid bottom (4) by drawing-blowing hot preforms (16) in a blowing mold that has a petaloid mold bottom (1) including radiating ridges (13) alternating with cavities (11) that are adapted to form the valleys (7) and the feet (5), respectively, of the container bottom; during drawing, heat losses are reduced in longitudinal zones (19) of the end part (20) of the preforms, extending over the bottom (18) and over an axial portion of their body (21), distributed over the periphery of the ends of the preforms facing respective cavities (11) of the mold bottom (1).

4 Claims, 5 Drawing Sheets

DRAWING-BLOWING METHOD AND DEVICE FOR MOLDING THERMOPLASTIC MATERIAL CONTAINERS, IN PARTICULAR BOTTLES, WITH PETALOID BOTTOMS

This is a divisional of application Ser. No. 11/635,019, filed Dec. 7, 2006, now U.S. Pat. No. 8,052,916, which claims foreign priority to FR 05 12486, filed Dec. 8, 2005. The entire disclosures of the prior applications, application Ser. No. 11/635,019 and FR 05 12486, are hereby incorporated by reference.

FIELD OF THE INVENTION

The present invention relates generally to the field of the manufacture of thermoplastic material, such as PET, containers, in particular bottles, and it relates more specifically to improvements made to molding methods and devices for the manufacture of thermoplastic material containers, in particular bottles, with petaloid bottoms by drawing-blowing from hot preforms in a blowing mold that also has a petaloid bottom including a plurality of radiating ridges alternating with cavities that are adapted to form, during molding, the valleys and the feet, respectively, of the petaloid bottom of the containers.

BACKGROUND OF THE INVENTION

Referring to FIGS. 1 to 3 of the appended drawings, there is shown therein—respectively in plan view, in diametral section taken along the line II-II in FIG. 1 and in partially cut-away three-quarter perspective view from above—a mold bottom 1 intended to equip a mold (not shown) for the manufacture of thermoplastic material, such as PET, containers, in particular bottles, by drawing-blowing hot preforms, which mold is part of a molding device (not shown) that may include a plurality of molds, for example a rotary device of the carousel type in which the molds are distributed peripherally.

As shown in FIG. 4, which is a three-quarter isometric perspective view from below of the bottom of a container 2 molded using a mold bottom 1 as shown in FIGS. 1 to 3, the container 2 has a body 3 and a bottom 4 of the so-called petaloid type featuring a plurality of excrescences forming feet 5, generally from four to six in number (generally five in the standard practice, as shown). These feet are angularly distributed in equidistant fashion and extend approximately parallel to the axis 6 of the container. They are separated from each other by radiating valleys 7 with a convex curvilinear bottom 8 (which may extend in a circular arc). All the valleys 7 converge at the center of the bottom 4 of the container, which may include a plateau 10 projecting slightly outward. The bottom 4 of the container is connected to the body 3 of the container by a connecting area 9 that is substantially a circular-section cylinder.

The mold bottom 1 is arranged in a complementary fashion and includes, for molding said bottom 4 of the container 2, cavities 11 in a number equal to the number of feet 5 of the container bottom 4 (five in the example shown in FIGS. 1 to 3) and constitutes a petaloid mold bottom 1. These cavities are angularly distributed in equidistant fashion relative to the axis 12 of the mold bottom (mutual angular separation of 72° in this example) and are separated from each other by radiating ridges 13 (that is to say projecting portions, elongate in a substantially radial direction, of the mold bottom which form said valleys in the bottom of the molded container). Each ridge 13 has a peak 14 of concave (for example circular arc) extent.

When a container is fabricated by drawing-blowing a hot preform in a blowing mold equipped with the mold bottom 1, the preform 16 starts by being drawn longitudinally in mechanical fashion, by the action of a drawing rod 15 introduced into the preform 16 and movable axially; the end 17 of the drawing rod 15, bearing against the bottom 18 of the preform 16, drives the latter into contact with the mold bottom 1, as represented in chain-dotted line in FIG. 2.

In FIG. 2, it is seen clearly that, once the mechanical drawing has been completed, the distance D1 separating the bottom of a cavity 11 from the facing portion of the preform 16 is very much greater than the distance D2 separating a ridge 13 from the facing portion of the preform 16. This means that, during pneumatic blowing phases or pneumatic pre-blowing phases followed by pneumatic blowing that complements the mechanical drawing, the thermoplastic material of the bottom 18 of the preform 16 is subjected to longitudinal and/or radial drawing rates that are very different according to their location; this is the case in particular according to whether it is a question of conforming the extremity of the excrescences forming feet 5, for which the drawing rate both longitudinally and radially is a maximum, or a question of conforming the bottom 8 of the valleys 7 interleaved between the feet, for which the drawing rate is lower.

Remember that, as a general rule, molding by drawing-blowing includes, in addition to the mechanical drawing step, at least one step of blowing by means of a fluid, typically air, at a very high pressure (typically of the order of $25 \times 10^5$ Pa to $40 \times 10^5$ Pa). The blowing step is most often preceded by a pre-blowing step using a fluid at a relatively low pressure (typically of the order of 10 to $15 \times 10^5$ Pa). The inclusion or absence of the pre-blowing step, and likewise the sequencing of the various steps, depend on the characteristics of the container to be fabricated.

Remember also that, in most cases, the drawing step is initiated first, followed by the pre-blowing step which, in many cases, begins when drawing has not been completed; blowing then begins, sometimes when drawing has not been completed. In other cases, pre-blowing may be initiated before drawing. In certain configurations, blowing begins after drawing is completed. In other cases, the sequence may be as follows: complete drawing, followed by pre-blowing and blowing. In extreme cases, there is no pre-blowing operation and blowing begins before or after drawing is completed.

Other sequences may be envisaged. In the remainder of the description, the term "blowing" employed without other qualification will designate without distinction, and whatever the sequencing relative to mechanical drawing, a step of blowing only or the succession of a pre-blowing step and a blowing step.

Regardless of the sequencing of the operations, to obtain a correct conformation of the bottom 4 of the container as a whole, it is necessary for the thermoplastic material to be at a temperature producing the optimum softening for homogeneous drawing, whilst at the same time maintaining the temperature below the crystallization temperature. It is then certain that the softened material can be fed correctly into the areas that are subject to the highest drawing rates, and thus that a container is obtained with a bottom having a relatively constant thickness throughout despite its complex shape.

Now, the drawing rod 15, which is made of metal, is brought into contact sequentially with the bottoms of successive hot preforms and its temperature undoubtedly rises because of these repetitive contacts; however, these contacts being only intermittent, the rod remains at all times at an average temperature substantially lower than that of the hot preforms. To give a concrete idea of this, the preforms are typically heated to a temperature of the order of 100° C. whereas the average temperature of the drawing rod remains of the order of 85° C.

Because of this, it is clear that, in the area of contact of the drawing rod 15 with the thermoplastic material of the bottom 18 of the preforms 16, that material, on conceding heat to the metal rod that serves as thermal receiver, is cooled locally. As a result of this, the thermoplastic material, becoming cooler, at least locally, loses a portion of its drawing capacity. It must also be emphasized that, when pushed by the end 17 of the rod, the thermoplastic material of the bottom 18 of the preform is deformed and to some degree shrinks around the end 17 of the rod, which increases the area of contact. This increases the heat exchange cited above.

The consequence is that, because of the insufficient mobility of the thermoplastic material during blowing, and regardless of the time at which it begins after the drawing rod has touched the bottom of the preform, too great a quantity of material remains in the central area of the bottom of the container in corresponding relationship to the position of the bottom of the preform. In concrete terms, the bottom of the containers features a thickness that varies greatly according to the location; the material thickness is a maximum in a central ring around the central plateau 10 or button, whereas it is a minimum in the bottom of the feet because of the insufficient supply of material.

This drawback is relatively unimportant when manufacturing containers with standard bottoms that feature reliefs that are relatively little differentiated and does not affect the quality of manufacture of such containers. On the other hand, the drawback referred to hereinabove becomes entirely relevant when manufacturing containers with a petaloid bottom: the correct formation of the feet 5 of the bottom necessitates a high rate of drawing of the thermoplastic material whereas that material is precisely that which has been in contact with the drawing rod 15 and has suffered a reduction in temperature. However, for containers having normal or small capacities (that is to say having capacities not exceeding approximately 2 liters), this drawback is relatively unimportant and until now no compensation has been envisaged for this type of container. On the other hand, for containers of significantly greater capacity (for example 3 or 3.5 liter containers), the difference in dimensions between the feet and the valleys becomes much greater and such that it is no longer possible to produce petaloid bottoms of correct shape under the conditions presently applying to containers of smaller capacity.

In an attempt to remedy this drawback, at least in part, it has already been envisaged to reduce as much as possible the area of contact of the drawing rod with the thermoplastic material of the bottom of the hot preforms. To this end, it has been proposed to use shouldered drawing rods that feature an end part of reduced diameter connected to the rod body by a shoulder (or even by a plurality of successive staggered shoulders). With this arrangement, the thermoplastic material is in contact with the rod only at the rounded tip thereof and along the peripheral edge of the shoulder, which represents a smaller area of contact than with a conventional drawing rod.

However, this shouldered drawing rod has the drawback of being aggressive with respect to the preforms. The hot thermoplastic material, which is fragile and easily torn, can easily be pierced by the smaller diameter end of the rod because the thrust force communicated by the rod to the bottom of the preform is applied over a reduced area; what is more, the peripheral edge of the shoulder, if it comes into contact with the thermoplastic material, may mark it or even cause it to tear.

SUMMARY OF THE INVENTION

An object of the invention is to respond to the primary practical requirement, namely to make it possible for the hot thermoplastic material to be drawn correctly wherever that is necessary, at the same time as avoiding the drawbacks of shouldered drawing rods and the risks of damaging or tearing the hot material associated therewith.

To these ends, in accordance with a first of its aspects that targets a method as referred to in the preamble, the invention proposes that, during the drawing phase, heat losses are reduced in longitudinal zones of the end part of the preforms, extending over the bottom and over an axial portion of the body of the preforms adjacent to the bottom, which are distributed over the periphery of the ends of the preforms sensibly facing respective cavities of the petaloid mold bottom.

Accordingly, the thermoplastic material of said longitudinal zones is, thanks to the reduced heat losses, maintained at a higher temperature and is therefore adapted to be drawn in more homogeneous fashion. A result of this is that the feet of the bottoms of the containers feature an increased thickness of material and are mechanically stronger, whereas, the thermoplastic material being better distributed, the bottoms of the containers feature lesser variations of thickness in their diverse portions. Finally, with the same quantity of thermoplastic material assigned to the production of each bottom of complex shape, stronger bottoms are obtained.

Preferably, according to the invention, for the drawing, a drawing rod is used that includes an end part, the external surface whereof features a plurality of recessed zones equal in number to the number of cavities of the mold bottom and angularly distributed identically to the angular distribution of said cavities, and said drawing rod is locked against rotation in a predetermined angular position such that said recessed zones are situated substantially facing the cavities of the petaloid mold bottom. Thus the hot thermoplastic material of a preform situated in said recessed zones does not come into contact with the drawing rod and suffers lower heat loss; thus held at a higher temperature, it can, during the drawing and blowing steps, be drawn more easily and with a greater amplitude of displacement precisely where that is required, namely in the areas in which the feet are formed. Moreover, the use of these arrangements does not affect in any way the structure of the component parts of the mold and of the molding device other than the drawing rod.

In a manner that is simple to put into practice and that has only a minimum effect on the conformation of the drawing rod, said recessed zones may be grooves extending longitudinally and recessed into the external surface of the drawing rod.

According to a second of its aspects, which targets a molding device as referred to in the preamble with a view to implementing the preferred aspect of the above method, the invention proposes that the drawing rod include an end part, the external surface whereof features peripherally a plurality of recessed domes equal in number to the number of cavities of the mold bottom and angularly distributed identically to the angular distribution of said cavities, and rotation locking means are functionally associated with said drawing rod to hold it locked in a predetermined angular position such that said recessed areas are situated substantially facing the cavities of the petaloid mold bottom.

In a preferred embodiment, the recessed zones are longitudinally extending grooves recessed in the external surface of the drawing rod. The grooves may advantageously have a depth and/or a width variable longitudinally, thanks to which the blowing fluid flowing in said grooves induces radially outward pre-deformations of the preferential zones of the preform facing said grooves.

In the most usual situation where the drawing rod is of generally circular-section cylindrical shape with a particular nominal diameter, the above dispositions may be combined with the additional one whereby the end part of the drawing rod comprises a circular-section cylindrical end portion having a diameter significantly less than said nominal diameter and a frustoconical intermediate connecting portion with a relatively low cone angle, and whereby the grooves extend not only over said end portion and intermediate portion of the drawing rod but also over a portion of nominal diameter adjacent to the frustoconical intermediate portion.

BRIEF DESCRIPTION OF THE DRAWINGS

The invention will be better understood on reading the following detailed description of certain preferred embodiments thereof provided by way of purely illustrative example only. The description refers to the appended drawing, in which.

DETAILED DESCRIPTION OF THE INVENTION

Figure 1:
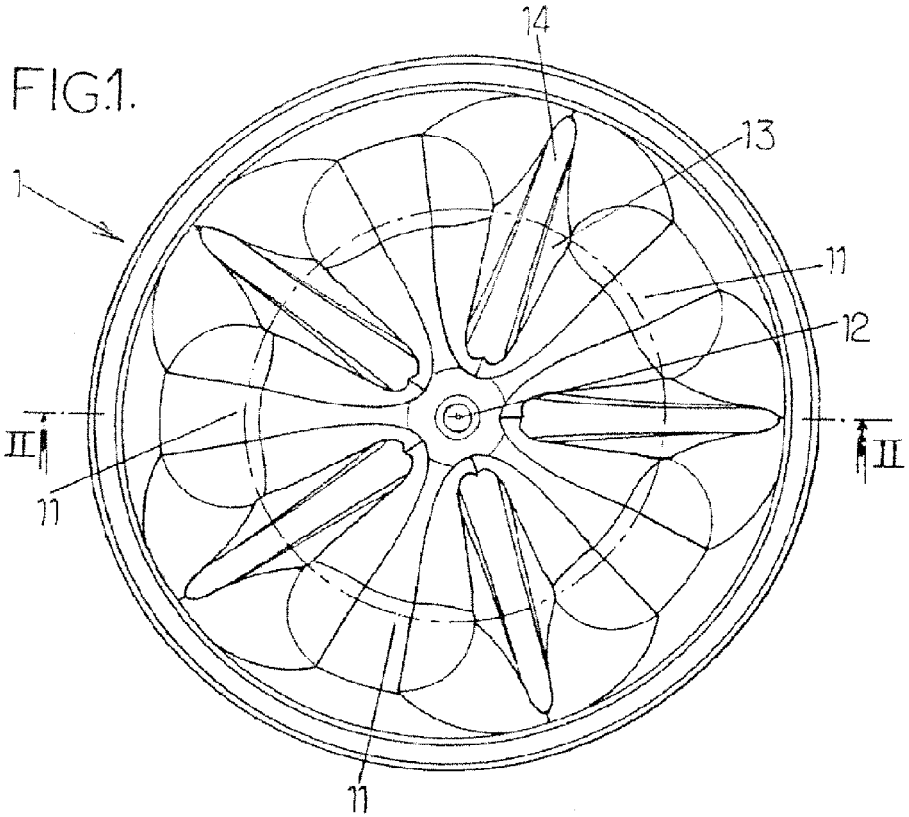
FIG. 1 is a plan view of a petaloid type mold bottom.
Figure 2:
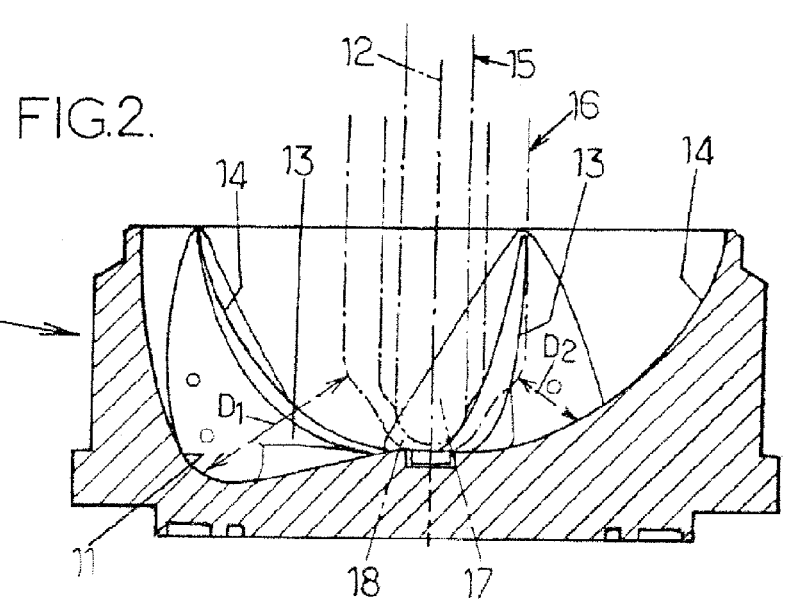
FIG. 2 is a view of the mold bottom from FIG. 1 in diametral section taken along the line II-II.
Figure 3:
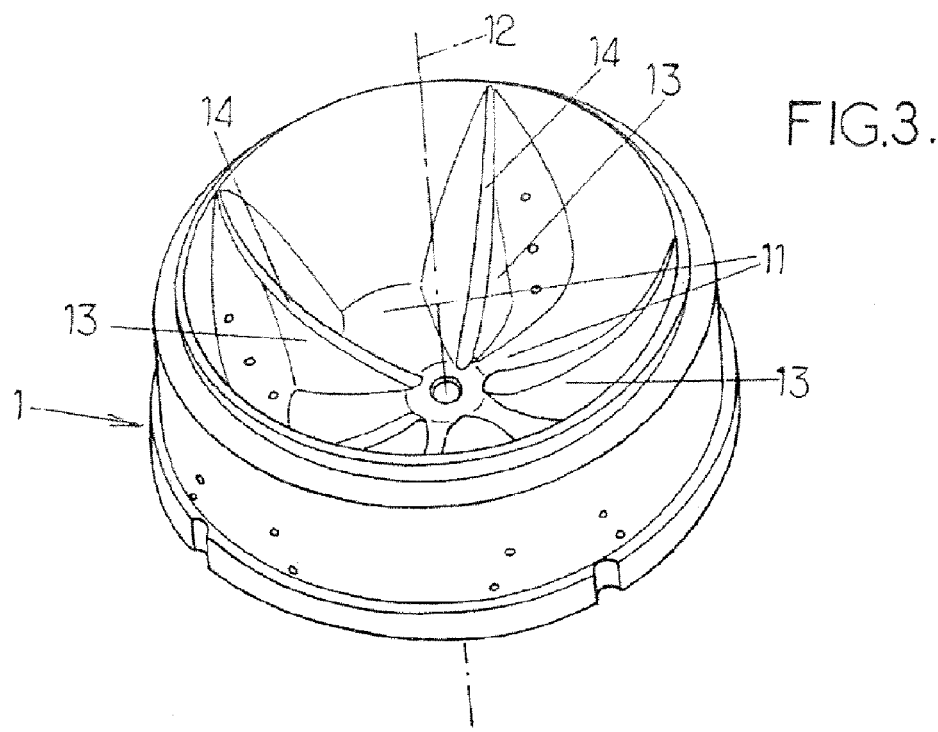
FIG. 3 is a partially cut-away three-quarter perspective view from above of the mold bottom from FIG. 1.
Figure 4:
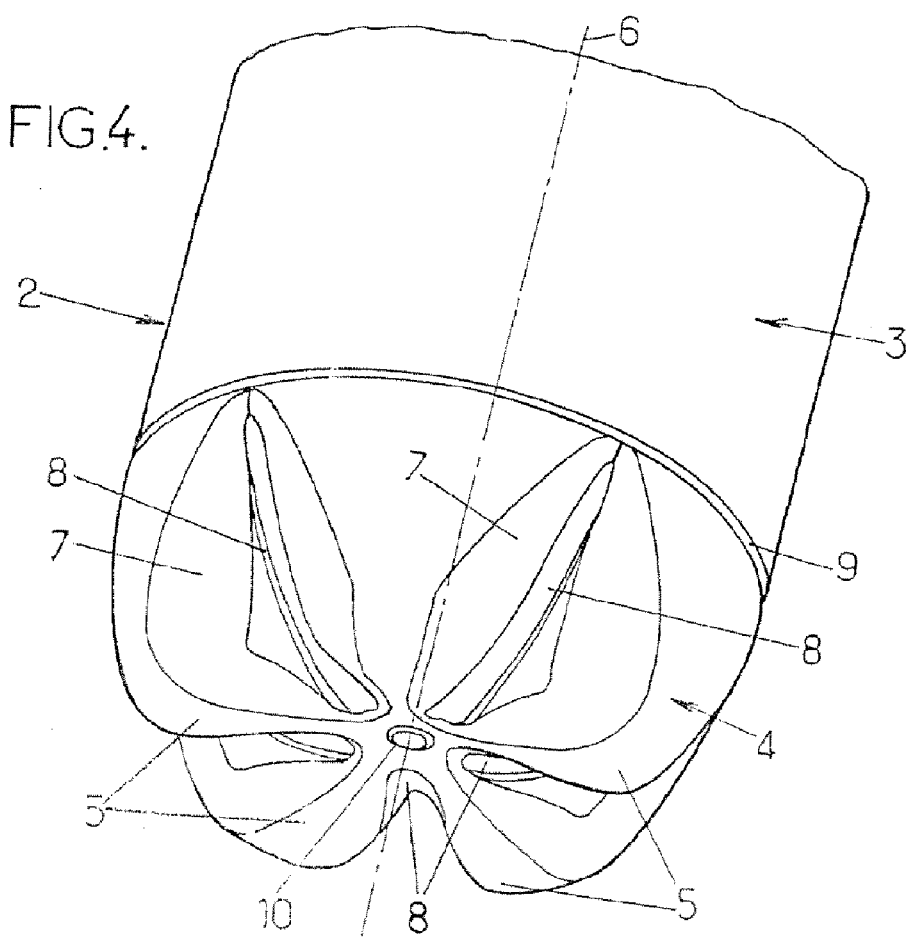
FIG. 4 is a partial three-quarter isometric perspective view from below of a container having a petaloid bottom molded by a mold bottom as shown in FIGS. 1 to 3.
Figure 5:
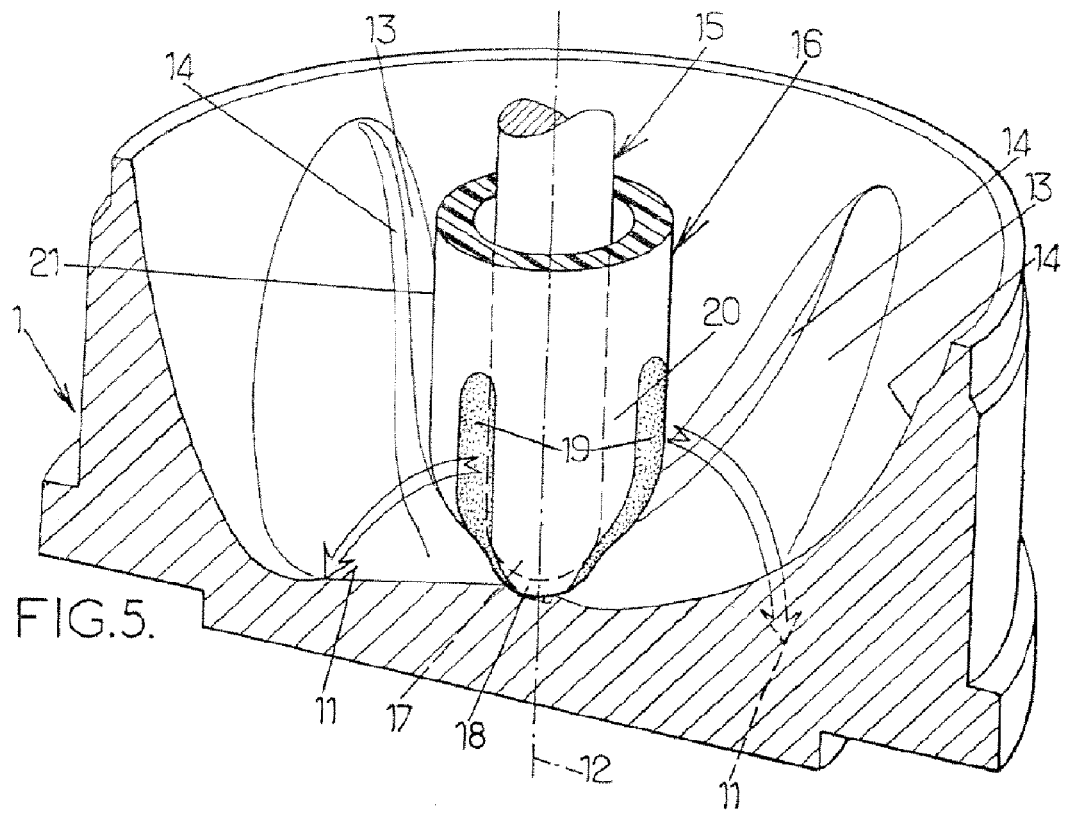
FIG. 5 is a view in section of a petaloid type mold bottom, with a drawing rod and a preform at the end of drawing, showing diagrammatically the method according to the invention.

FIG. 5 is now referred to first, in which members and parts identical to those of FIGS. 1 to 4 are designated by the same reference numbers.

In accordance with the invention, it is provided that, during the drawing phase, the heat losses are reduced in the longitudinal zones 19 of the end portion 20 of the preform 16, extending over the bottom 18 of the latter and over an axial portion of the body 21 of the preform adjacent to said bottom 18, which are distributed over the periphery of the end of the preform substantially facing the respective cavities 11 of the mold bottom 1.

Thanks to this arrangement, the thermoplastic material of said longitudinal zones 19 remains at a higher temperature than that it had in the usual solution and it is therefore adapted to be drawn in a more homogeneous and better distributed fashion during blowing. Consequently, the thickness of the bottom is more uniform throughout: the central portion of the bottom is of reduced thickness whereas the feet of the bottom of the containers have an increased thickness of material and are mechanically stronger.

The person skilled in the art may envisage diverse practical solutions for reducing the heat losses in the zones 19 cited above, for example by input of heat in said zones to compensate the heat transfers to the drawing rod. Nevertheless, it is desirable for the solution adopted for implementing the method of the invention to be as simple as possible and to have no effect on the structure of the mold, and in particular that of the mold bottom, which may already prove very complex for other reasons (in particular for cooling it).

It is against this background that the means leading to a localized reduction of the heat losses in the end of the preform have been implemented not in the mold but on the drawing rod.

Figure 6A:
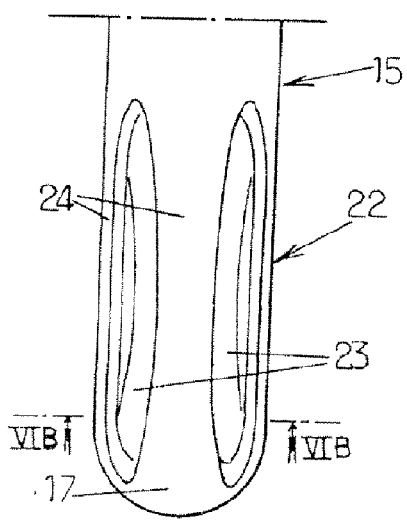
FIG. 6A is a side view showing the end portion of a drawing rod adapted to implement the method according to the invention.

According to the invention, the external surface of the end part 22 of the drawing rod 15 features, as seen in FIG. 6A, a plurality of peripheral recessed zones 23 equal in number to the number of cavities 11 in the mold bottom 1, and angularly distributed in a manner identical to the angular distribution of said cavities 11.

Thanks to this disposition, contact is avoided of the drawing rod 15 with preferential zones of the bottom 18 of the preform, with the result that in these zones the temperature of the thermoplastic material is not lowered by heat exchange with the rod. In these zones, the thermoplastic material therefore retains an enhanced malleability that enables it to be drawn more easily in the direction of the cavities 11 of the mold bottom during blowing.

Figure 6B:
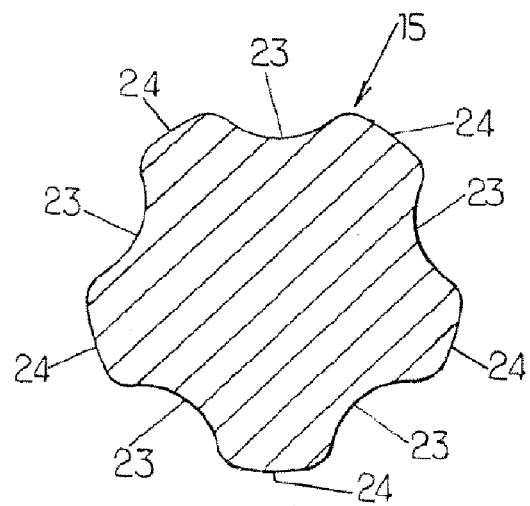
FIG. 6B is a view to a larger scale of the drawing rod from FIG. 6A in section taken along the line VIB-VIB.

The recessed zones 23 are advantageously longitudinally extending grooves recessed into the external surface of the drawing rod 15, and these grooves define between them free portions 24 of the external surface of the rod 15. In the remainder of the description, the reference number "23" will be used without distinction to designate the recessed zones or the grooves. In FIG. 6B, the view in section of the drawing rod 15 from FIG. 6A shows five grooves 23 angularly distributed in a regular fashion, with a separation of 72°, so that they are positioned facing five respective cavities 11 of the mold bottom 1 from FIG. 8.

Apart from the thermal advantage achieved as explained hereinabove, the recessed zones, in particular the grooves 23 can also serve a function during the blowing step, in particular if the latter is started before the end of the mechanical drawing process using the drawing rod. In fact, the pressurized blowing fluid is guided by the grooves 23 to the bottom 18 of the preforms 16. The zones 19 of the preforms cited above are preferentially subjected to the pressure of the blowing fluid and, remaining in a state of sufficient malleability because they are less cooled, they are subject to the beginning of radial outward deformation (predeformations 29 in FIG. 9). In other words, even before the end of the preform as a whole has begun to be deformed by the action of the blowing fluid, the zones 19 cited above begin to be subjected to a localized predeformation 29 in the direction of the cavities 11 of the mold bottom 1. This predeformation 29, although of relatively small amplitude (it is greatly exaggerated in FIG. 9 for reasons of clarity), may nevertheless make a favorable contribution to more effective forming of the feet.

Figure 7A:
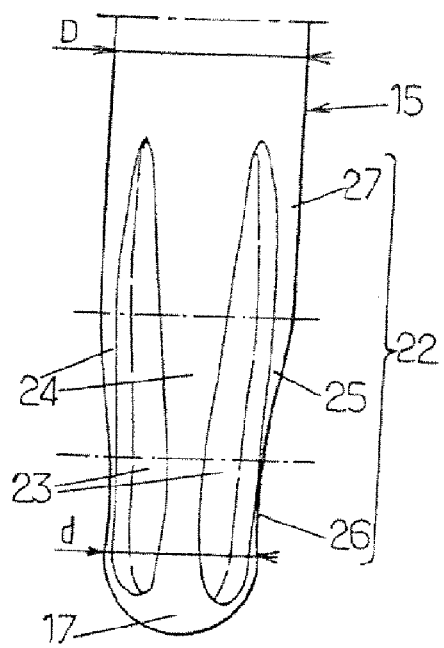
FIG. 7A is a side view showing a preferred embodiment of the drawing rod from FIG. 6A.
Figure 9:
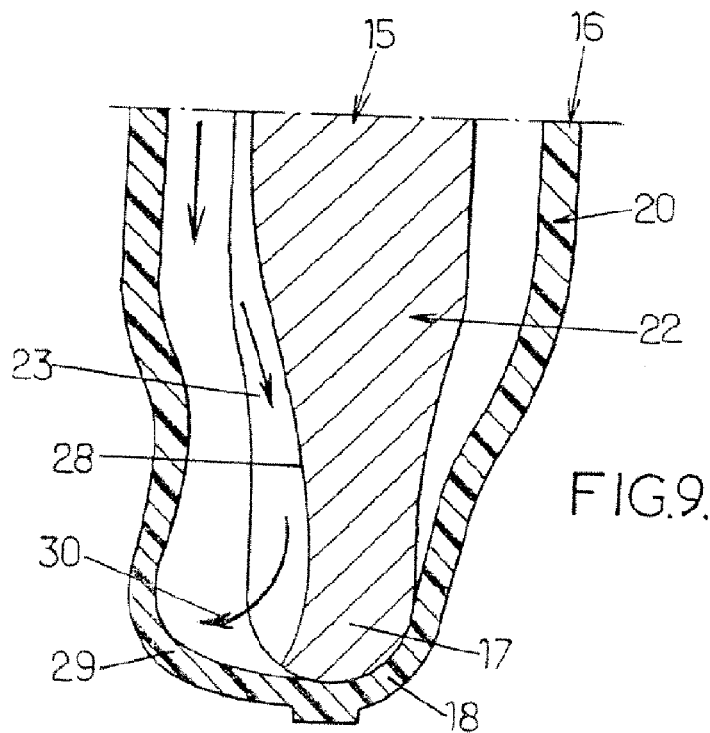
FIG. 9 is a view in section and to a larger scale of the end portions of a preform and a drawing rod as shown in FIGS. 7A, 7B, showing a particular effect procured by a drawing rod adapted in accordance with the invention.
Figure 8:
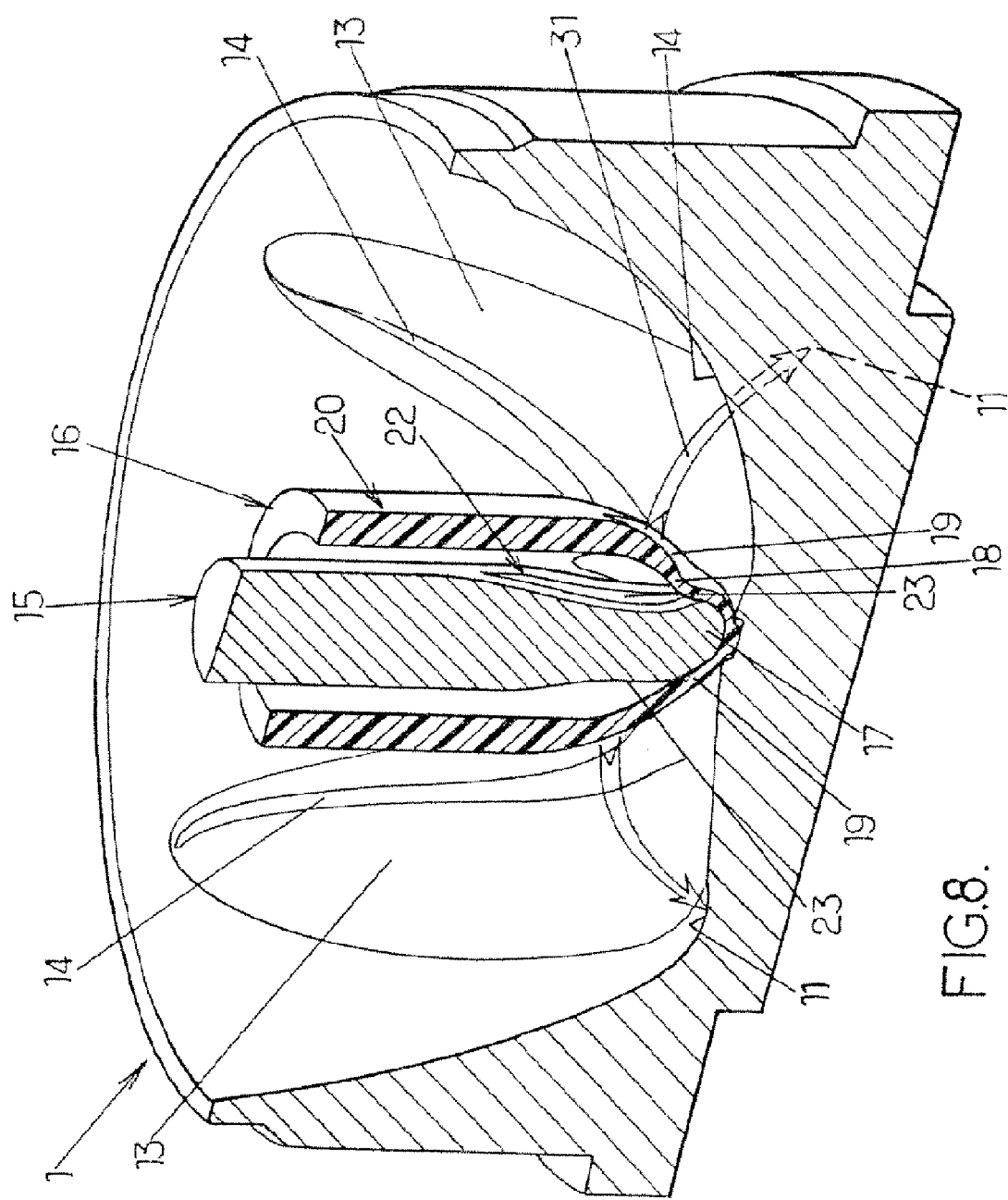
FIG. 8 is a view in section analogous to that of FIG. 5 showing the use of the drawing rod from FIGS. 7A and 7E.

To enhance the effect that has just been explained, the grooves 23 may be efficaciously profiled in the manner shown in FIGS. 6A, 7A and 8. To this end, as shown in FIG. 9, their bottom 28 may be profiled in such a manner that, considered from the top toward the bottom of the rod, the latter begins by being recessed, then curves in the direction of the external face of the rod 15 in order for the jets of fluid under pressure contained in the grooves to be sprayed (arrow 30) against the internal face of the zones 19 of the preforms with a radial component of movement (toboggan effect). A reduction of the width of the grooves from the top toward the bottom of the rod may also be envisaged, in particular to form restrictions adapted to accelerate the jets of fluid under pressure sprayed onto the zones 19.

Moreover, the grooves 23 may extend over a significant longitudinal portion of the end part 22 of the drawing rod 15, significantly exceeding the height of the contact between the rod and the internal wall of the preform, so as to ensure that the blowing fluid may be easily contained therein.

Figure 7B:
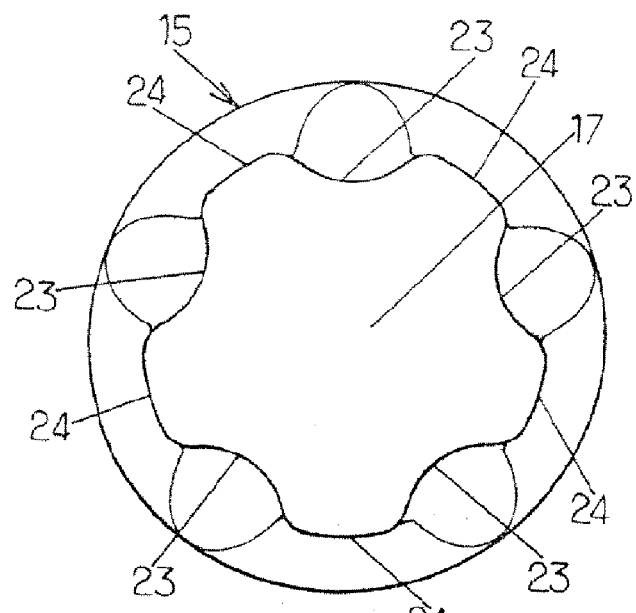
FIG. 7B is an end view to a larger scale of the drawing rod from FIG. 7A.

In a preferred embodiment, that represented in FIGS. 7A and 7B, the drawing rod 15 is of generally circular-section cylindrical shape with a particular nominal diameter D, but its end part 22 features an end portion of circular-section cylindrical shape having a diameter d substantially less than said nominal diameter D, and an intermediate connecting portion 25 of frustoconical shape having a relatively low cone angle. The grooves 23 extend not only over said end portion 26 and intermediate portion 25 of the drawing rod, but also over a portion 27 of nominal diameter adjacent to the frustoconical intermediate portion 25. In other words, the end portion 22 consists of said portions 25, 26 and 27.

Thanks to this arrangement, in addition to the effect procured by the grooves 23, it is possible to prevent or to reduce the contact of the hot thermoplastic material with the drawing rod, in a manner analogous to what was attempted with shouldered rods, but without the risk of damaging the material inherent to the presence of the shoulder.

Finally, there is provision in the molding device for rotation locking means (not shown) to be functionally associated with said drawing rod 15 to hold it locked in a predetermined angular position relative to the mold, and in particular relative to the mold bottom, so that said recessed zones 23 are situated substantially facing the cavities 11 of the mold bottom 1.

FIG. 8 is a view analogous to that of FIG. 5 showing the use of the drawing rod 15 that has just been described with reference to FIGS. 7A and 7B. The grooves 23 of the drawing rod 15, and thus the less cooled zones 19 of the end of the preform 16, are disposed facing the cavities 11 of the mold bottom 1. The arrows 31 indicate diagrammatically the direction of preferential drawing of the material of the zones 19 in the direction of the cavities 11.

What is claimed is:

1. A molding device for manufacturing thermoplastic material containers with petaloid bottom by drawing-blowing hot preforms, which device comprises at least one blowing mold having a petaloid mold bottom comprising a plurality of radiating ridges alternating with cavities that are adapted to form, during molding, valleys and feet, respectively, of the petaloid bottom of the containers, said mold being functionally associated with a drawing rod movable substantially along the axis of the bottom of the mold, wherein the drawing rod comprises an end part, the external surface whereof comprises peripherally a plurality of recessed domes equal in number to the number of cavities of the mold bottom and angularly distributed identically to the angular distribution of said cavities, and wherein rotation locking means are functionally associated with said drawing rod to hold said drawing rod locked in a predetermined angular position such that said recessed areas are situated substantially facing the cavities of the petaloid mold bottom.

2. Molding device according to claim 1, wherein the recessed zones are longitudinally extending grooves recessed in the external surface of the end part of the drawing rod.

3. Molding device according to claim 2, wherein the grooves have a depth and/or a width variable longitudinally.

4. Molding device according to claim 2 in which the drawing rod is of generally circular-section cylindrical shape with a particular nominal diameter, wherein the end part of the drawing rod comprises a circular-section cylindrical end portion having a diameter significantly less than said nominal diameter and a frustoconical intermediate connecting portion with a relatively low cone angle, and wherein the grooves extend not only over said end portion and intermediate portion of the drawing rod but also over a portion of nominal diameter adjacent to the frustoconical intermediate portion.

\* \* \* \* \*